(12) United States Patent
Taga et al.

(10) Patent No.: US 6,181,449 B1
(45) Date of Patent: Jan. 30, 2001

(54) WAVELENGTH DIVISION MULTIPLEXED OPTICAL PROCESSING DEVICE AND OPTICAL COMMUNICATION TRANSMISSION PATH

(75) Inventors: Hidenori Taga, Sakado; Kaoru Imai, Tokyo; Masatoshi Suzuki, Kawajima-machi; Shu Yamamoto, Shiki; Shigeyuki Akiba, Tokyo, all of (JP)

(73) Assignee: Kokusai Denshin Denwa Kabushiki-Kaisha, Tokyo (JP)

( * ) Notice: Under 35 U.S.C. 154(b), the term of this patent shall be extended for 0 days.

(21) Appl. No.: 09/032,537

(22) Filed: Feb. 27, 1998

(30) Foreign Application Priority Data

Mar. 28, 1997 (JP) .................................................. 9-077998

(51) Int. Cl.[7] ...................................................... H04J 14/02
(52) U.S. Cl. .............................. 359/124; 359/161; 385/24
(58) Field of Search .................................. 359/124, 130, 359/161; 385/24, 37

(56) References Cited

U.S. PATENT DOCUMENTS 5,452,116 * 9/1995 Kirkby et al. ........................ 359/124
5,706,377 * 1/1998 Li ........................................ 385/37

* cited by examiner

Primary Examiner—Kinfe-Michael Negash
(74) Attorney, Agent, or Firm—Olson & Hierl, Ltd.

(57) ABSTRACT

A wavelength division multiplexed optical processing device and an optical communication transmission path which are capable of significantly improving the transmission characteristic of wavelength division multiplexed optical signals. A wavelength division multiplexed optical processing device is formed by a first arrayed optical waveguide for demultiplexing entered wavelength division multiplexed optical signals, and outputting demultiplexed optical signals; a plurality of correction units for correcting respective optical signals demultiplexed by the first arrayed optical waveguide; and a second arrayed optical waveguide for multiplexing optical signals corrected by the correction unit, and outputting multiplexed optical signals. An optical communication transmission path is formed by an optical transmission path; and at least one wavelength division multiplexed optical processing device using an arrayed optical waveguide having a transmission wavelength characteristic with a flat top shape, which is inserted into the optical transmission path at a prescribed interval.

25 Claims, 14 Drawing Sheets

WAVELENGTH DIVISION MULTIPLEXED OPTICAL PROCESSING DEVICE AND OPTICAL COMMUNICATION TRANSMISSION PATH

BACKGROUND OF THE INVENTION

1. Field of the Invention

The present invention relates to a wavelength division multiplexed optical processing device and an optical communication transmission path for transmitting wavelength division multiplexed optical signals while compensating or reducing at least one of dispersion slope of optical fiber transmission paths, wavelength dependency of optical amplifier gain, and accumulated optical noise generated by optical amplifiers.

2. Description of the Background Art

In recent years, much attentions have been attracted to the optical communication using wavelength division multiplexed optical signals in which optical signals in different wavelengths are multiplexed. For optical amplification of the wavelength division multiplexed optical signals, erbium-doped optical fibers formed by doping erbium in optical fibers are used, for example. An optical amplifier using erbium doped optical fiber is capable of amplifying the wavelength division multiplexed optical signals collectively so that it is well suited for the wavelength division multiplexed optical communication, and there is a report of a long distance transmission experiment which was conducted over a distance of 9000 km (see, H. Taga, et al., "110 Gbit/s (22×5 Gbit/s), 9500 km transmission experiment using 980 nm pump EDFA 1R repeater without forward error correction", Optical Amplifiers and Their Applications 1996, PDP5).

In a long distance wavelength division multiplexed optical signal transmission through optical fiber transmission paths using such optical amplifiers, the known factors that degrade the transmission characteristic includes accumulated wavelength dispersion for each signal wavelength caused by the wavelength dispersion slope of the optical fiber transmission paths, wavelength dependency of optical amplifier gains, and accumulate noise of optical amplifiers.

As for the accumulated wavelength dispersion, the transmission characteristic can be improved by the equalization realized by giving the same amount of wavelength dispersion as the accumulated wavelength dispersion but in an opposite sign at a receiving end. However, when a bit rate is high or when an absolute value of the accumulated amount is excessively large, it is difficult to improve the transmission characteristic by the equalization at a receiving end. There is also an easily conceivable method for compensating the dispersion slope itself by separating each wavelength component of the wavelength division multiplexed signals and cancelling the slope in a manner of equalization by giving appropriate dispersion to each wavelength component separately, but there has been no known scheme that can account for possible transmission degradation due to characteristics of wavelength separation elements.

As for the wavelength dependency of the optical amplifier gains, a flat optical amplifier gain can be realized over a wave wavelength range by inserting into the optical amplifier a gain equalizer element that has an inverse characteristic with respect to the gain wavelength dependency (see, P. F. Wysocki, et al., "Erblum-Doped Fiber Amplifier Flattened Beyond 40 nm Using Long-Period Grating", Optical Fiber Communication Conference (OFC) 1997, PD2). However, the practical realization of such a gain equalization element is associated with some technical difficulties.

As for the accumulated noise of optical amplifiers, it is the physical phenomenon that is unavoidable as long as optical amplifiers are used, so that high performance optical amplifiers with low noise factor can be employed in order to reduce the accumulated noise as much as possible (see, H. Taga, et al., "110 Gbit/s (22×5 Gbit/s), 9500 km transmission experiment using 980 nm pump EDFA 1R repeater without forward error correction", Optical Amplifiers and Their Applications 1996, PDP5). However, higher performance optical amplifiers are more expensive, and associated with a drawback that the reliability of light sources for optical pumping is low.

SUMMARY OF THE INVENTION

It is therefore an object of the present invention to provide a wavelength division multiplexed optical processing device and an optical communication transmission path which are capable of significantly improving the transmission characteristic of wavelength division multiplexed optical signals. In short, the present invention achieves this object by integrally realizing dispersion slope compensation, gain wavelength dependency compensation, and accumulated optical noise reduction which have been accounted separately in the prior art, with respect to dispersion slope of optical fiber transmission paths, wavelength dependency of optical amplifier gains, and accumulated optical noise generated by optical amplifiers which are factors causing degradation of the transmission characteristic of wavelength division multiplexed optical signals in the prior art.

According to one aspect of the present invention there is provided a wavelength division multiplexed optical processing device, comprising: a first arrayed optical waveguide for demultiplexing entered wavelength division multiplexed optical signals, and outputting demultiplexed optical signals; a plurality of correction units for correcting respective optical signals demultiplexed by the first arrayed optical waveguide; and a second arrayed optical waveguide for multiplexing optical signals corrected by the correction unit, and outputting multiplexed optical signals.

According to another aspect of the present invention there is provided an optical communication transmission path for transmitting wavelength division multiplexed optical signals, comprising: an optical transmission path; and at least one wavelength division multiplexed optical processing device using an arrayed optical waveguide having a transmission wavelength characteristic with a flat top shape, which is inserted into the optical transmission path at a prescribed interval.

Other features and advantages of the present invention will become apparent from the following description taken in conjunction with the accompanying drawings.

DETAILED DESCRIPTION OF THE PREFERRED EMBODIMENTS

Figure 1:
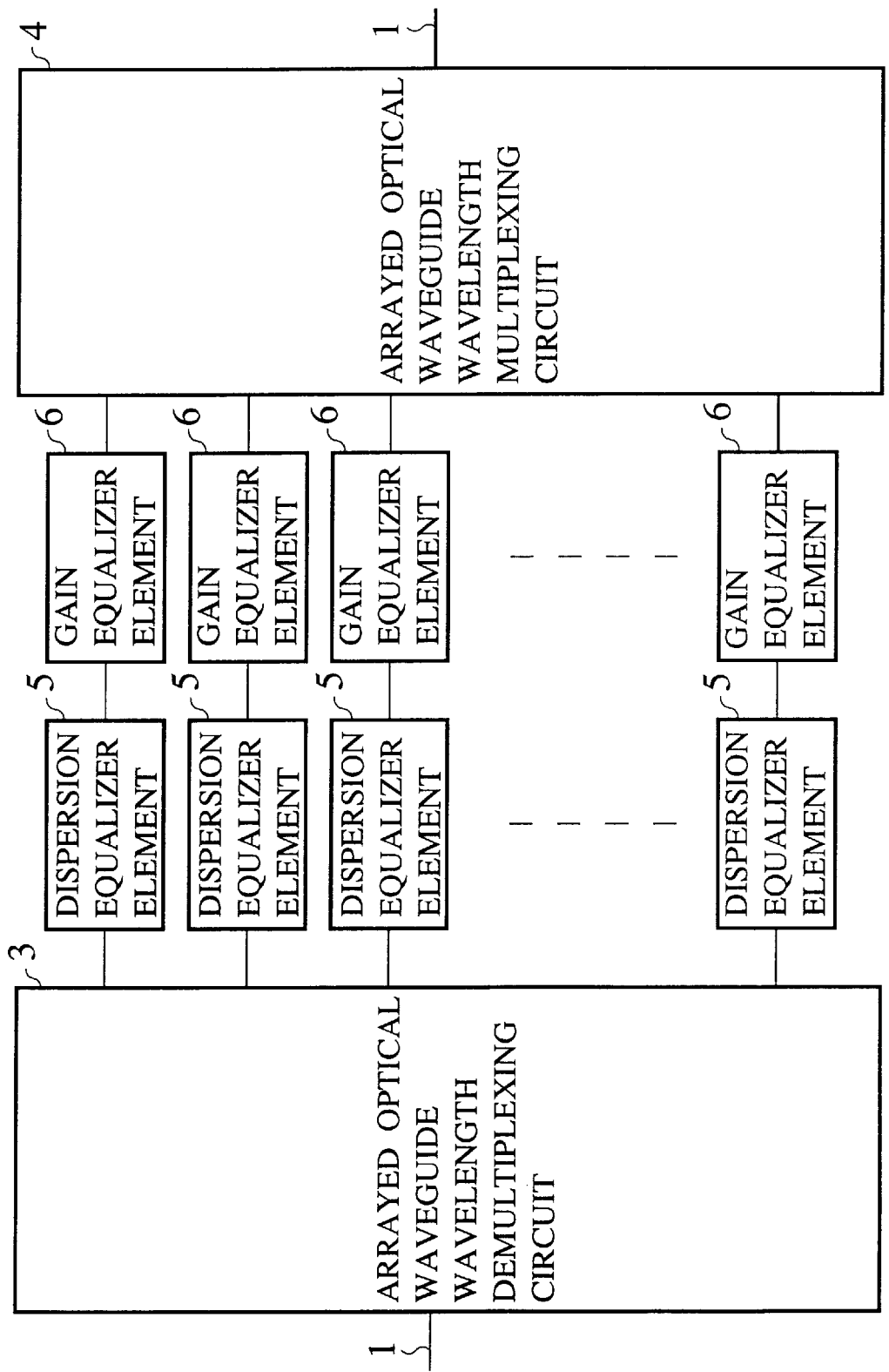
FIG. 1 is a block diagram of one embodiment of a wavelength division multiplexed optical processing device according to the present invention.
Figure 2:
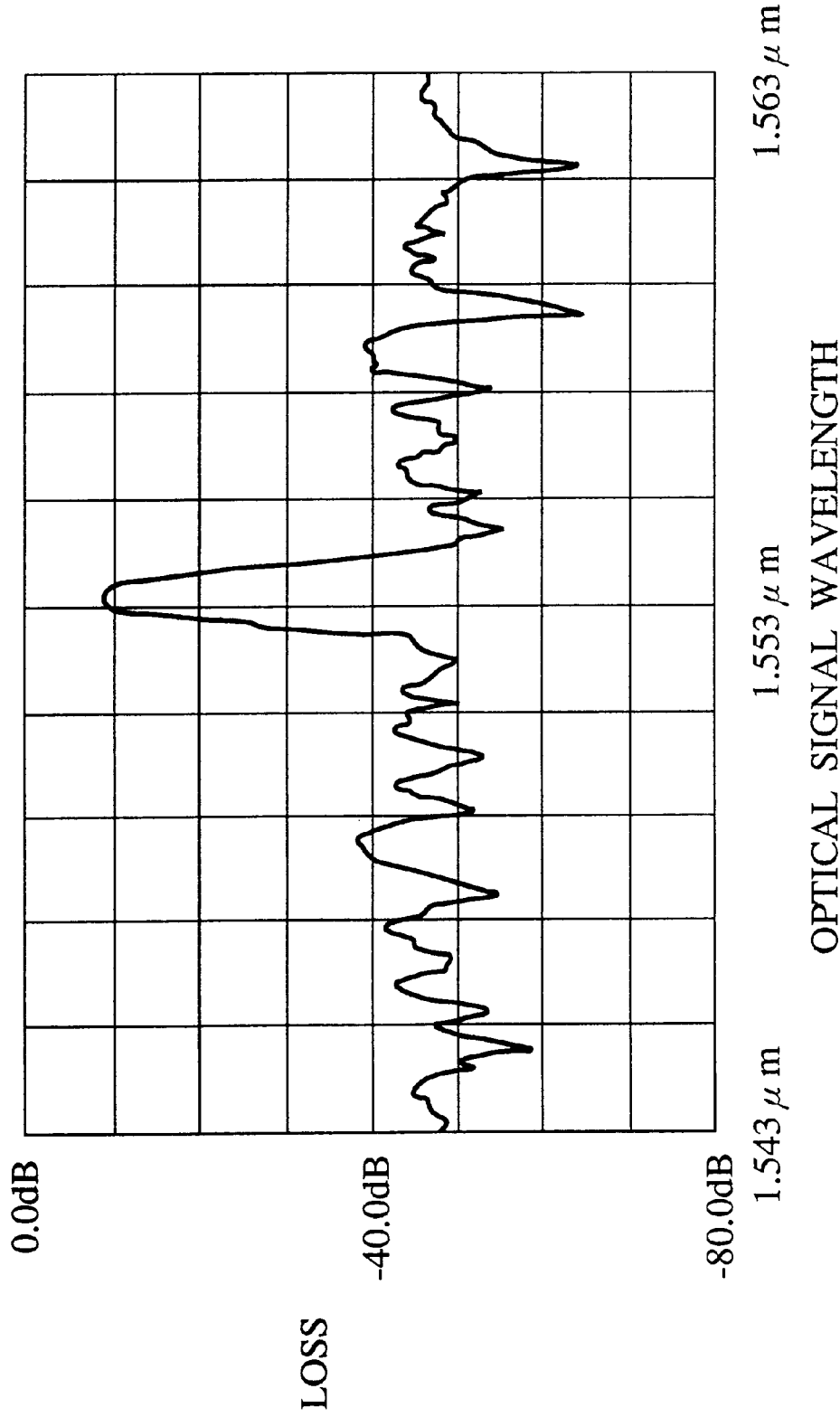
FIG. 2 is a characteristic diagram showing an exemplary transmission characteristic of an arrayed optical waveguide used in the wavelength division multiplexed optical processing device of FIG. 1.

Referring now to FIG. 1 and FIG. 2, one embodiment of a wavelength division multiplexed optical processing device according to the present invention will be described in detail.

The wavelength division multiplexed optical processing device of this embodiment has a configuration as shown in FIG. 1, which comprises an arrayed optical waveguide wavelength demultiplexing circuit 3, an arrayed optical waveguide wavelength multiplexing circuit 4, and plural sets of a dispersion equalizer element 5 and a gain equalizer element 6 provided between the arrayed optical waveguide wavelength demultiplexing circuit 3 and the arrayed optical waveguide wavelength multiplexing circuit 4.

The arrayed optical waveguide wavelength demultiplexing circuit 3 functions as a first arrayed optical waveguide which receives wavelength division multiplexed optical signals transmitted through an optical fiber 1 on an input side at a light input terminal, demultiplexes these entered optical signals, and outputs demultiplexed signals from a plurality of light output terminals. Each set of the dispersion equalizer element 5 and the gain equalizer element 6 functions as means for correcting corresponding optical signal demultiplexed by the first arrayed optical waveguide. The arrayed optical waveguide wavelength multiplexing circuit 4 functions as a second arrayed optical waveguide which receives optical signals outputted from the gain equalizer elements 6 at a plurality of light input terminals, multiplexes these entered optical signals, and outputs multiplexed optical signals from a light output terminal to an optical fiber 1 on an output side.

Each of the first and second arrayed optical waveguides has a transmission wavelength characteristic given by a waveform with a flat top shape (i.e. its top portion is flat) in which 0.3 dB bandwidth is more than or equal to ⅓ of 3 dB bandwidth (see FIG. 12 described below).

In this configuration, the entered wavelength division multiplexed optical signals are demultiplexed wavelength by wavelength by the arrayed optical waveguide wavelength demultiplexing circuit 3, and a dispersion compensation for each wavelength is carried out on each demultiplexed optical signal by each dispersion equalizer element 5 provided in correspondence to each wavelength. In addition, a gain compensation for each wavelength is carried out by each gain equalizer element 6 connected to each dispersion equalizer element 5, and all the wavelengths are multiplexed again by the arrayed optical waveguide wavelength multiplexing circuit 4.

The arrayed optical waveguide used for the arrayed optical waveguide wavelength demultiplexing circuit 3 and the arrayed optical waveguide wavelength multiplexing circuit 4 has a rejection of about 2 dB at least outside a transmission bandwidth as shown in FIG. 2, so that optical noise outside the transmission bandwidth is suppressed and accumulated optical noise is reduced. The transmission characteristic of wavelength division multiplexed optical signals can be improved by inserting several circuits of this type into an optical communication transmission path using optical amplifiers. Here, the optical noise is generated at a time of amplification of optical signals at an optical amplifier, so that the optical noise is accumulated whenever the optical signals pass through an optical amplifier. On the other hand, the arrayed optical waveguide suppresses lights of wavelengths other than the transmission permitted optical signals by 30 dB or more, so that the optical noise to be superposed onto the optical signals by an optical amplifier is also suppressed as much and therefore the accumulated optical noise is reduced.

Note that the arrayed optical waveguide wavelength demultiplexing circuit 3 and the arrayed optical waveguide wavelength multiplexing circuit 4 can be formed by identical arrayed optical waveguides. Namely, the arrayed optical waveguide can be used for the wavelength demultiplexing when lights are passed from one light input terminal (single port) to many light output terminals (multiple ports), or for the wavelength multiplexing when lights are passed from many light input terminals (multiple ports) to one light output terminal (single port). Consequently, by using the arrayed optical waveguide with a light input terminal with two ports and a light output terminal with two ports, the bidirectional communications can be readily realized.

The dispersion equalizer elements 5 are elements for carrying out the dispersion slope compensation (equalization), which are provided as many as a number of optical signals to be demultiplexed by the arrayed optical waveguide wavelength demultiplexing circuit 3. Normally, the dispersion slope is a property that the wavelength dispersion of an optical fiber has a wavelength dependency, and in a case of transmitting wavelength division multiplexed signals, this dispersion slope gives rise to a problem as it changes an amount of dispersion caused for each wavelength (i.e. it causes different amounts of dispersion for different wavelengths). For this reason, the dispersion equalizer elements 5 carry out the dispersion slope compensation using any available technique, such that the dispersion slope appears to be zero and amount of dispersion becomes constant for all the wavelengths.

The gain equalizer elements 6 are elements for carrying out the gain wavelength dependency compensation, which are individually connected in series to respective dispersion equalizer elements 5 and provided as many as a number of the dispersion equalizer elements 5. Normally, the amplification characteristic (gain) of an optical amplifier has a wavelength dependency, so that when the wavelength division multiplexed signals are amplified by a single optical amplifier, wavelengths with higher gain and wavelengths with lower gain will be produced. In order to prevent this, the gain equalizer elements 6 carry out the gain wavelength dependency compensation by giving attenuations to those wavelengths with higher gain using optical attenuators with built-in automatic output control circuits, and/or giving further gains to those wavelengths with lower gain using optical amplifiers with built-in automatic output control circuits, such that the gain deviation among wavelengths is eliminated.

Figure 3:
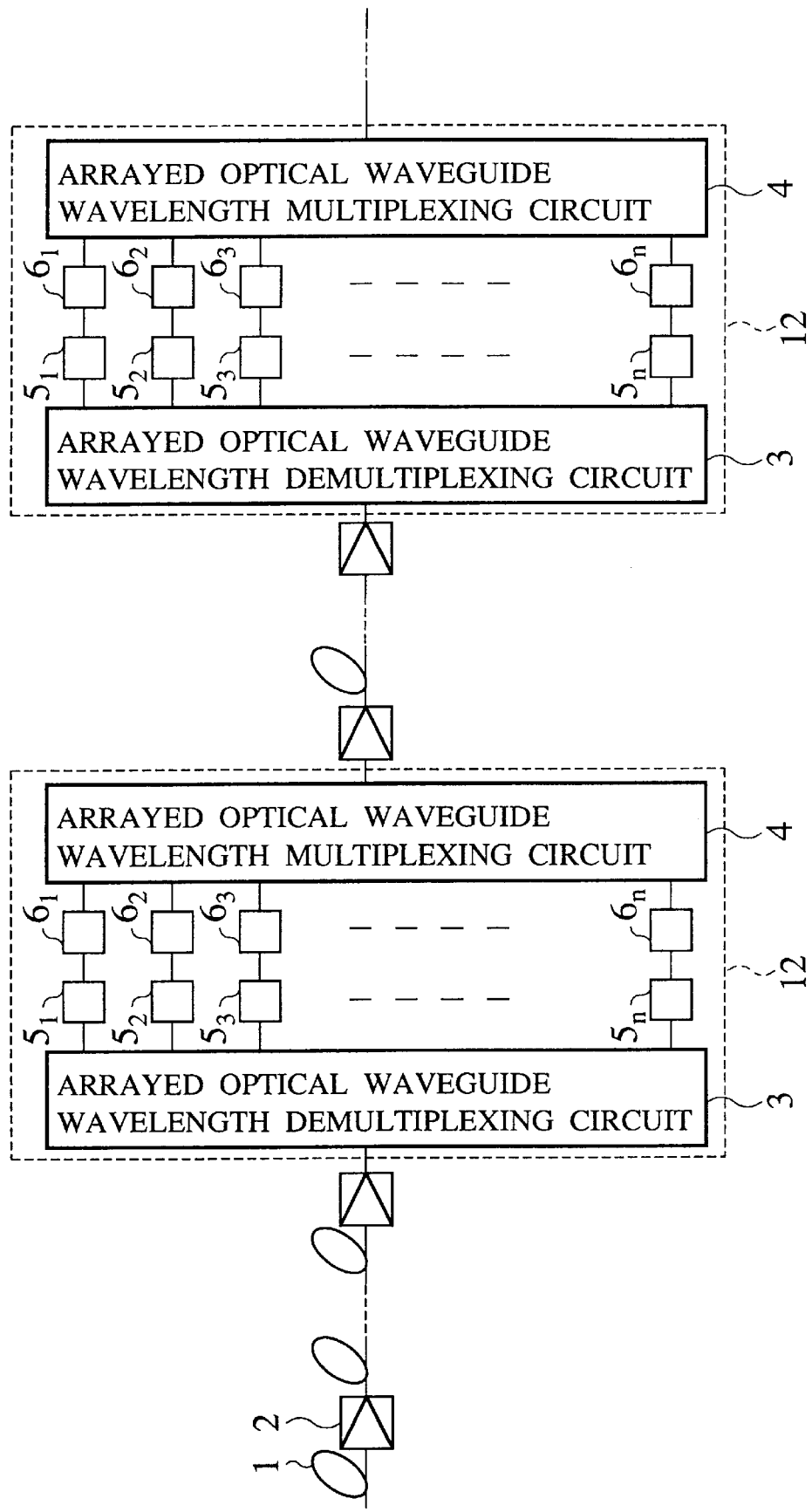
FIG. 3 is a block diagram of the first embodiment of an optical communication transmission path according to the present invention.

Referring now to FIG. 3, the first embodiment of an optical communication transmission path according to the present invention will be described in detail.

In this first embodiment, the optical communication transmission path has a configuration as shown in FIG. 3, where an optical amplifier 2 is provided at a prescribed shorter interval on an optical fiber 1 for transmitting wavelength division multiplexed optical signals, and a wavelength division multiplexed optical processing device 12 of the present invention is provided at a prescribed longer interval on the optical fiber 1. Here, the wavelength division multiplexed optical processing device 12 comprises the arrayed optical waveguide wavelength demultiplexing circuit 3, the arrayed optical waveguide wavelength multiplexing circuit 4, and plural sets of the dispersion equalizer element 5 and the gain equalizer element 6, as in the configuration of FIG. 1 described above. In FIG. 3, the suffix attached to the reference numerals 5 and 6 of the dispersion equalizer elements and the gain equalizer elements indicates a channel number of the wavelength division multiplexed signals. In this embodiment, signals in n wavelengths are multiplexed into a single optical fiber and transmitted through the optical communication transmission path.

In this embodiment, the wavelength division multiplexed optical processing device 12 is to be repeatedly inserted at an interval of a prescribed number of repeaters (which is assumed to be m). The n wavelength division multiplexed signals are demultiplexed wavelength by wavelength by the arrayed optical waveguide wavelength demultiplexing circuit 3, dispersion equalized and gain equalized by the dispersion equalizer element 5 and the gain equalizer element 6, and then n wavelength division multiplexed again by the arrayed optical waveguide wavelength multiplexing circuit 4.

As a dispersion equalization device to be used for the dispersion equalizer element 5, it is possible to use a device such as a usual optical fiber having the zero dispersion wavelength at 1.3 μm, a special optical fiber (known as a dispersion compensation fiber) having a large normal dispersion at 1.55 μm, and an optical fiber grating capable of causing a frequency (wavelength) dependent delay.

Here, it is also possible to use the optical fibers having zero dispersion wavelength at 1.3 μm which have dispersion amounts greater than those required for making dispersion of respective signal wavelengths exactly zero, and appropriate amount of abnormal dispersion for stabilizing optical pulses due to the soliton effect such as below several hundreds ps/nm, so as to improve the transmission characteristic.

Similarly, it is also possible to use the dispersion compensation optical fibers having a large normal dispersion at 1.55 μm which have dispersion amounts less than those required for making dispersion of respective signal wavelengths exactly zero, and appropriate amount of abnormal dispersion for stabilizing optical pulses due to the soliton effect such as below several hundreds ps/nm, so as to improve the transmission characteristic.

Similarly, it is also possible to use the optical fibers having zero dispersion wavelength at 1.3 μm and the dispersion compensation optical fibers having a large normal dispersion at 1.55 μm which have such dispersion amounts that dispersion of respective signal wavelengths cannot be made exactly zero and all the signal wavelengths are contained within abnormal dispersion region, so as to improve the transmission characteristic.

As a gain equalization device to be used for the gain equalizer element 6, it is possible to use a device such as an optical attenuator capable of causing a loss, and an optical amplifier capable of providing a gain.

Note that it is possible to use both of the dispersion equalizer element 5 and the gain equalizer element 6 in a form of combination of any of the above mentioned devices, or it is possible to use only one of the dispersion equalizer element 5 or the gain equalizer element 6 so as to provide a function only of a dispersion slope equalization circuit or a gain equalization circuit.

FIG. 2 shows an exemplary characteristic in a case where the arrayed optical waveguide is used as the optical wavelength multiplexing and demultiplexing circuit. In this example, only signals at a wavelength of 1553.2 nm are transmitted while lights of the other wavelengths are blocked by a suppression rate of over 30 dB. Consequently, the optical noise that is present outside a vicinity of the signal wavelength is suppressed by 30 dB so that the accumulated optical noise is reduced as much.

Referring now to FIG. 4 to FIG. 10, the second embodiment of an optical communication transmission path according to the present invention will be described in detail.

Figure 4:
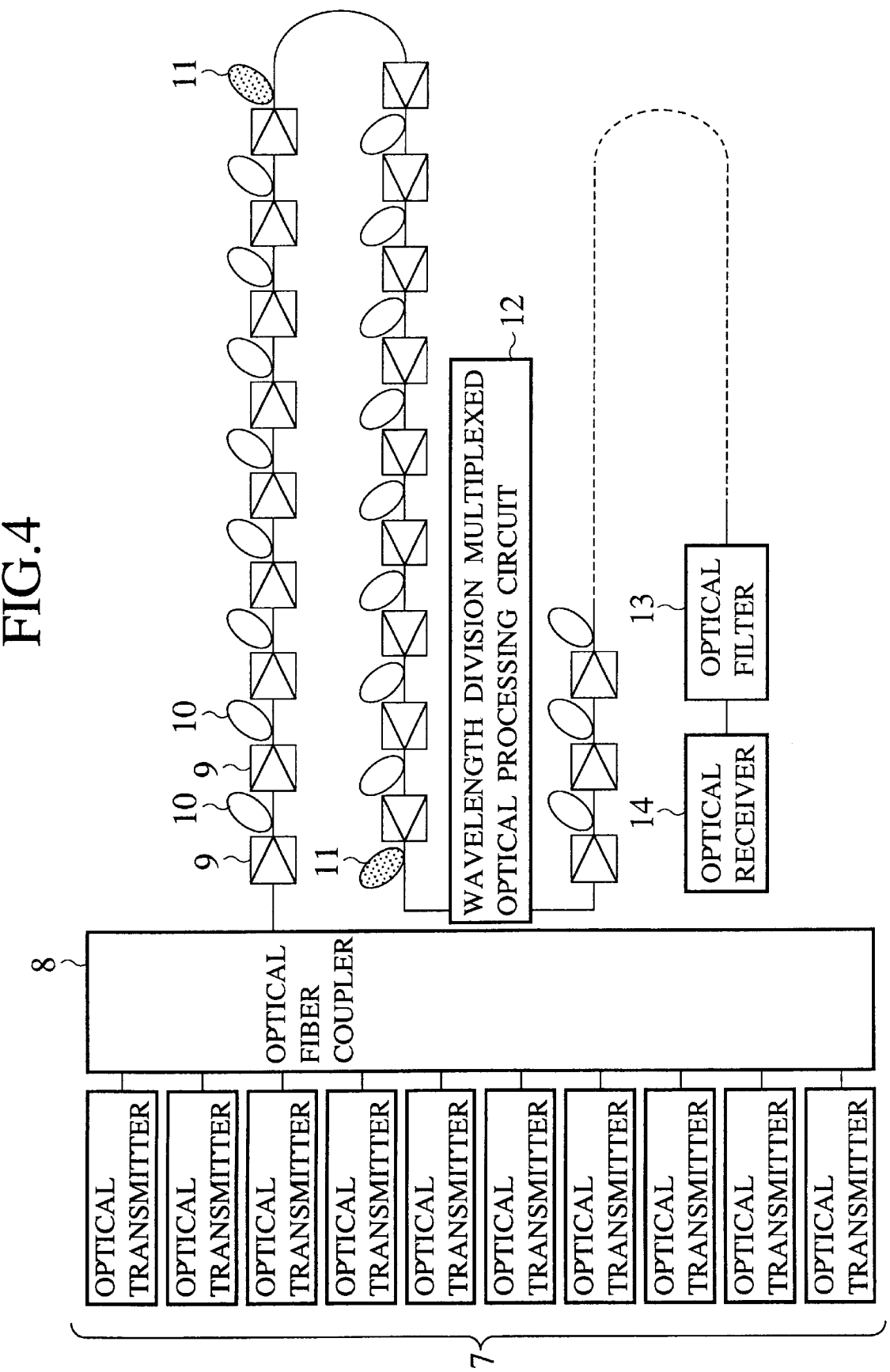
FIG. 4 is block diagram of the second embodiment of an optical communication transmission path according to the present invention.

This second embodiment is directed to the actually conducted optical signal transmission experiment for 10 wavelength division multiplexed 10 Gbit/s optical signals using 10 sets of 10 Gbit/s optical transmitters 7 in a configuration shown in FIG. 4. In this configuration of FIG. 4, an optical fiber coupler 8 multiplexes optical signals from 10 sets of 10 Gbit/s optical transmitters 7. A dispersion shifted optical fiber 10 connected to each optical amplifier 9 has a length of 40 km, and an optical fiber 11 is a usual optical fiber having a zero dispersion wavelength at 1.3 μm and a length of 49 km. A wavelength division multiplexed optical processing circuit 12 of the present invention carries out the dispersion slope compensation, the gain wavelength dependency compensation, and the accumulated optical noise reduction as described above. An optical filter 13 separates optical signals, and an optical receiver 14 is a 10 Gbit/s optical receiver.

The 1.3 μm zero dispersion optical fiber 11 is inserted at an interval corresponding to a span of eight of the dispersion shifted optical fibers 10 (320 km), and the wavelength division multiplexed optical processing device 12 is inserted at an interval corresponding to two periods (738 km) in terms of a period (369 km) formed by the dispersion shifted optical fibers 10 and the 1.3 μm zero dispersion optical fibers 11. The zero dispersion wavelength of the optical fiber transmission path formed by the dispersion shifted optical fibers 10 and the 1.3 μm zero dispersion optical fibers 11 is set approximately at a center of the bandwidth of 10 wavelength optical signals.

Figure 5:
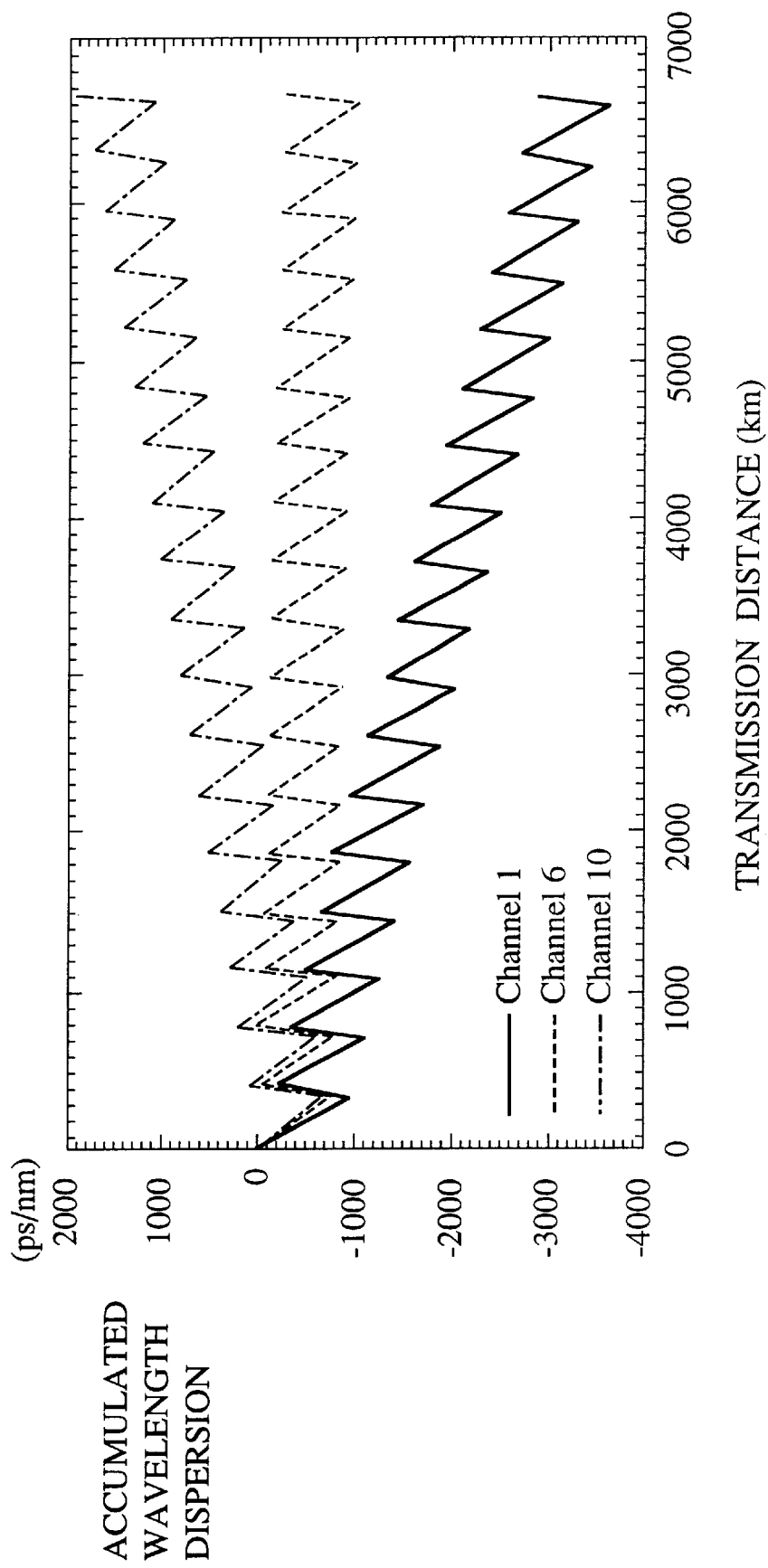
FIG. 5 is a graph showing a distance dependency of an accumulated wavelength dispersion in a case of not using a wavelength division multiplexed optical processing device of the present invention in the optical communication transmission path of FIG. 4.

FIG. 5 shows a distance dependency of the accumulated wavelength dispersion for various wavelengths in a case of not inserting the wavelength division multiplexed optical processing device 12. As can be seen in FIG. 5, the accumulated wavelength dispersion is small for wavelengths near the zero dispersion, but becomes larger toward both ends of the signal bandwidth.

Figure 6:
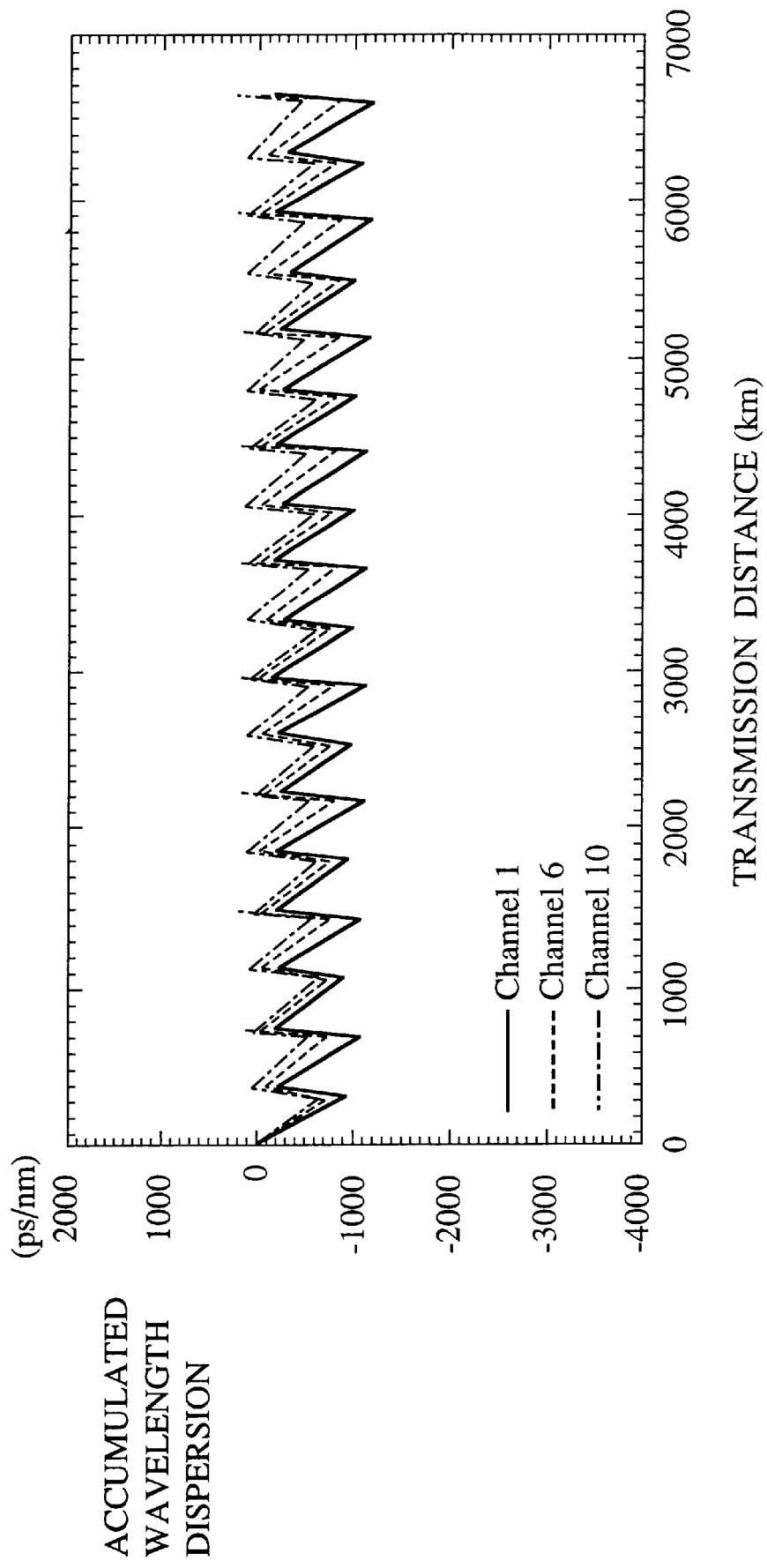
FIG. 6 is a graph showing a distance dependency of an accumulated wavelength dispersion in a case of using a wavelength division multiplexed optical processing device of the present invention in the optical communication transmission path of FIG. 4.

FIG. 6 shows a distance dependency of the accumulated wavelength dispersion for various wavelengths in a case of inserting the wavelength division multiplexed optical processing device 12. As can be seen in FIG. 6, all the signal wavelengths have nearly zero dispersion, unlike the case shown in FIG. 5.

Figure 7:
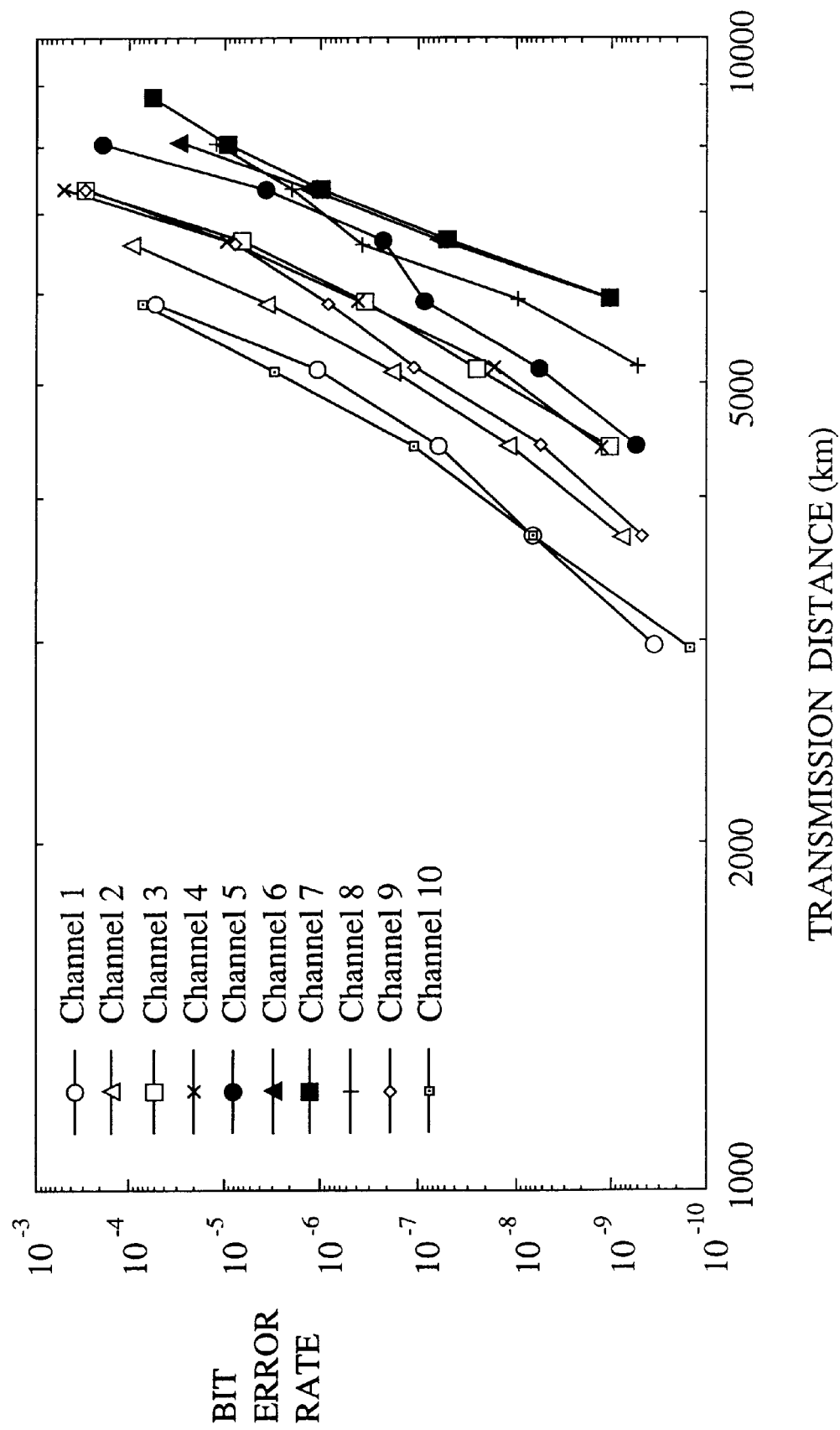
FIG. 7 is a graph showing a measurement result on a distance dependency of a bit error rate in a case of not using a wavelength division multiplexed optical processing device of the present invention in the optical communication transmission path of FIG. 4.
Figure 8:
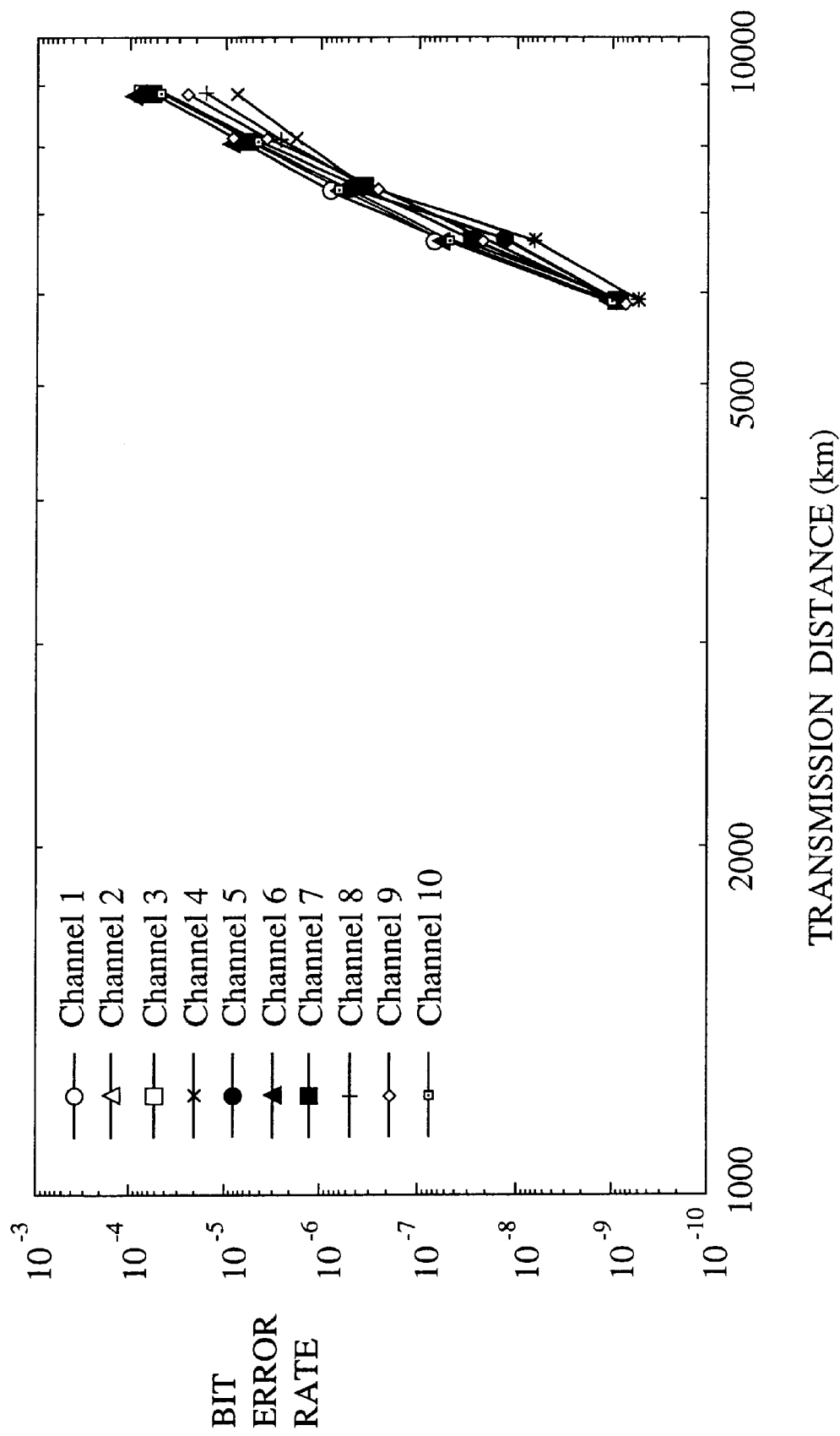
FIG. 8 is a graph showing a measurement result on a distance dependency of a bit error rate in a case of using a wavelength division multiplexed optical processing device of the present invention in the optical communication transmission path of FIG. 4.

FIG. 7 shows a measurement result on a distance dependency of a bit error rate for various signal wavelengths in a case of not inserting the wavelength division multiplexed optical processing device 12, while FIG. 8 shows a measurement result on a distance dependency of a bit error rate for various signal wavelengths in a case of inserting the wavelength division multiplexed optical processing device 12. It can be seen that, in FIG. 8, the bit error rate of $10^{-9}$ or less is realized for distances of 6000 km or more for all of 10 wavelengths, whereas in FIG. 7, the bit error rate of $10^{-9}$ or less is realized for distances of 6000 km or more similarly as in FIG. 8 for signals near the zero dispersion at which the accumulated dispersion becomes nearly zero, but the distance for which the error bit rate of $10^{-9}$ or less can be realized becomes shorter as the wavelength approaches to the both ends of the signal bandwidth where the accumulated dispersion becomes large due to the influence of the dispersion slope.

Figure 9:
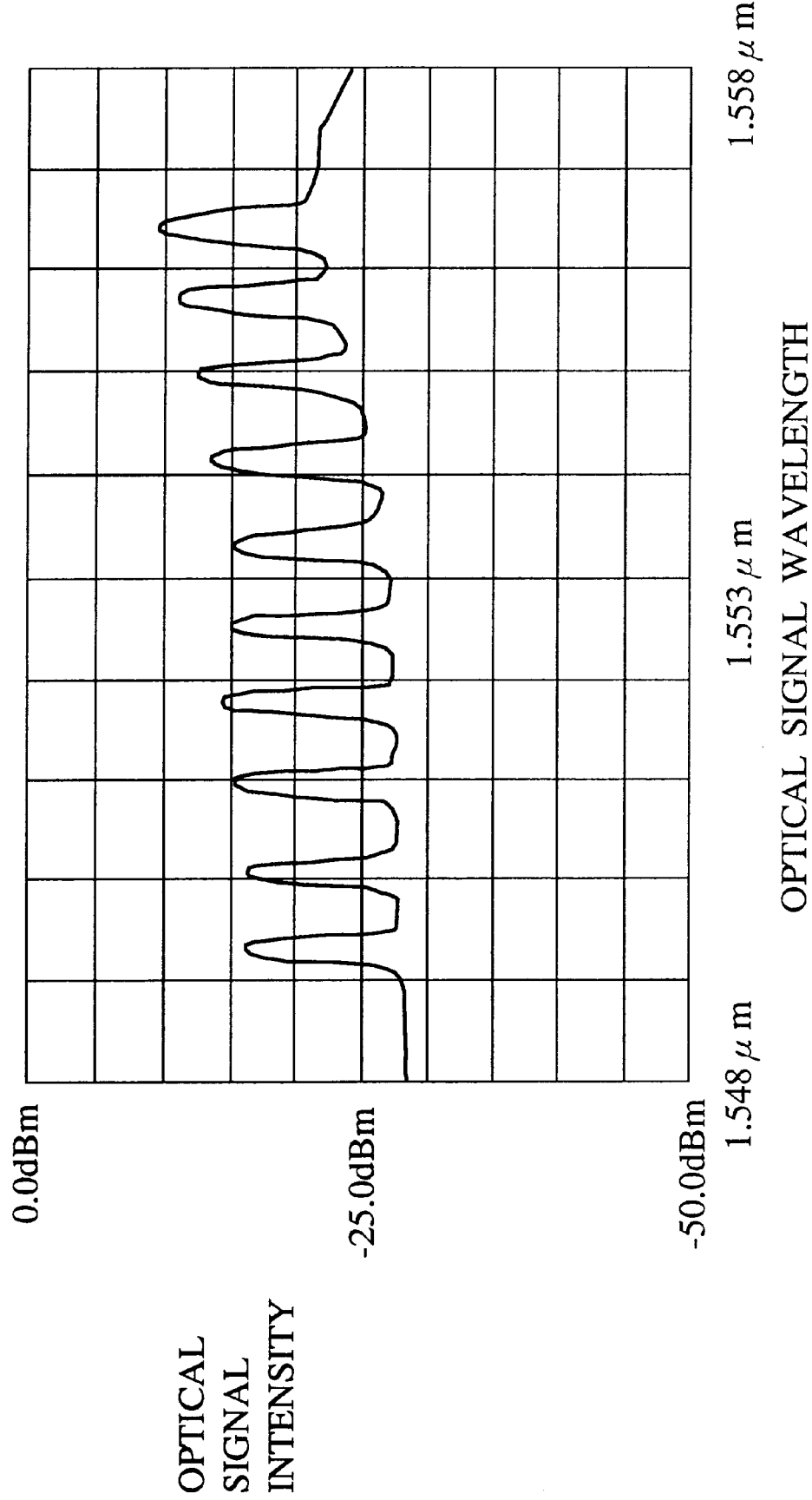
FIG. 9 is a graph showing an optical spectrum after transmission in a case of not using a wavelength division multiplexed optical processing device of the present invention in the optical communication transmission path of FIG. 4.
Figure 10:
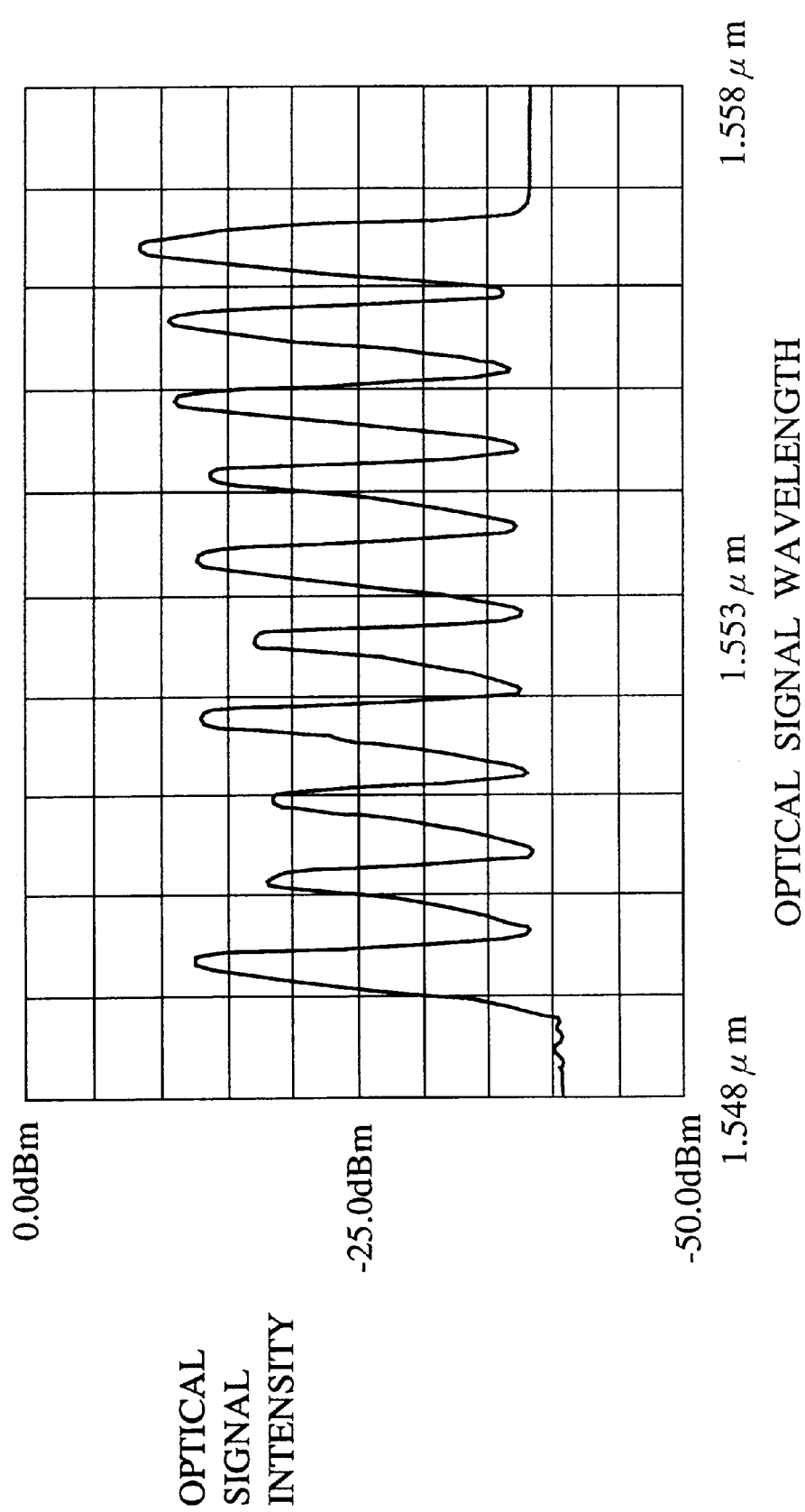
FIG. 10 is a graph showing an optical spectrum after transmission in a case of using a wavelength division multiplexed optical processing device of the present invention in the optical communication transmission path of FIG. 4.

FIG. 9 shows an optical spectrum after transmission for 6642 km in a case of not inserting the wavelength division multiplexed optical processing device 12, while FIG. 10 shows an optical spectrum after transmission for 6642 km in a case of not inserting the wavelength division multiplexed optical processing device 12. It can be seen from the comparison of FIG. 9 and FIG. 10 that the accumulated optical noise outside the optical signal bandwidth is effectively suppressed by inserting the wavelength division multiplexing optical processing device From these observations, it is verified that the wavelength division multiplexed optical processing device 12 have considerable effects of the dispersion slope compensation, the gain wavelength dependency compensation, and the accumulated optical noise reduction, for the wavelength division multiplexed signal transmission.

In the optical communication transmission of this embodiment, the return-to-zero waveform and the abnormal dispersion region are utilized in order to reduce the waveform distortion by obtaining some optical soliton effects. Unlike the non-return-to-zero waveform, the optical soliton has a tolerance with respect to the dispersion amount as the waveform changes according to the dispersion amount, whereas the non-return-to-zero waveform has an upper limit for the dispersion amount as the waveform becomes wide spread when the dispersion amount is excessively large. For this reason, this embodiment adopts the following conditions for the dispersion slope compensation by the dispersion equalizer elements 5 that function as the dispersion slope compensation circuits: that is, the accumulated abnormal dispersion amount for each signal wavelength satisfies the following equation (1) at each interval by which the dispersion slope compensation is carried out, and the following equation (2) after the transmission over the entire optical communication transmission path.

$$0 < d < 0.1 \times l (\text{ps/nm}) \quad (1)$$

$$0 < D < 0.1 \times L (\text{ps/nm}) \quad (2)$$

where d is a dispersion amount for an interval of insertion of the dispersion equalizer elements 5, l is the interval of insertion of the dispersion equalizer elements 5 in km unit, D is a dispersion amount over the entire optical communication transmission path, and L is a total length of the optical communication transmission path in km unit.

Also, in the optical communication transmission experiment described in this embodiment, it was found out by experimentally changing waveform that the transmission characteristic is not so largely degraded as long as the following criteria are satisfied.

(1) A waveform of incident optical signals is the return-to-zero waveform.

(2) The return-to-zero waveform has a duty ratio in a range of 10% to 80%, or more preferably in a range of 40% to 70%.

(3) The return-to-zero waveform has an intensity ratio of 1.5 or more, or more preferably in a range of 2 to 20, where the intensity ratio is a ratio of the maximum light intensity portion and the minimum light intensity portion among those bits for which the optical signals are in ON states.

(4) The return-to-zero waveform has a position in time of the maximum light intensity which is not limited to a position in time corresponding to 50% of one bit time period. More specifically, the usual return-to-zero waveform has the maximum light intensity position limited to a position corresponding to 50% of one bit time period, but the return-to-zero waveform used in this embodiment can have the maximum light intensity position at any position within one bit time period.

In addition, it was also found out that it suffices for such a return-to-zero waveform to have at least two properties among the properties that the duty ratio is in a range of 10% to 80%, that the intensity ratio is 1.5 or more, and that the maximum light intensity position in time is not limited to a position in time corresponding to 50% of one bit time period.

Note that, according to the present invention, the entered wavelength division multiplexed optical signals at the first optical waveguide (the arrayed optical waveguide wavelength demultiplexing circuit 3) can have an identical basic waveform for all signal wavelengths. Namely, it has conventionally been necessary to optimize waveform for each signal wavelength separately (see, N. S. Bergano, et al., "Long-Haul WDM Transmission Using Optimum Channel Modulation: A 160 Gb/s (32×5 Gb/s) 9,300 km Demonstration", Optical Fiber Communication Conference (OFC) 1997, PD16). This is because the dispersion slope has not been compensated conventionally. In contrast, the optical communication transmission path of the present invention compensates the dispersion slope so that it is no longer necessary to optimize waveform for each signal wavelength separately, and it becomes possible to use an identical basic waveform for all signal wavelengths.

Figure 11:
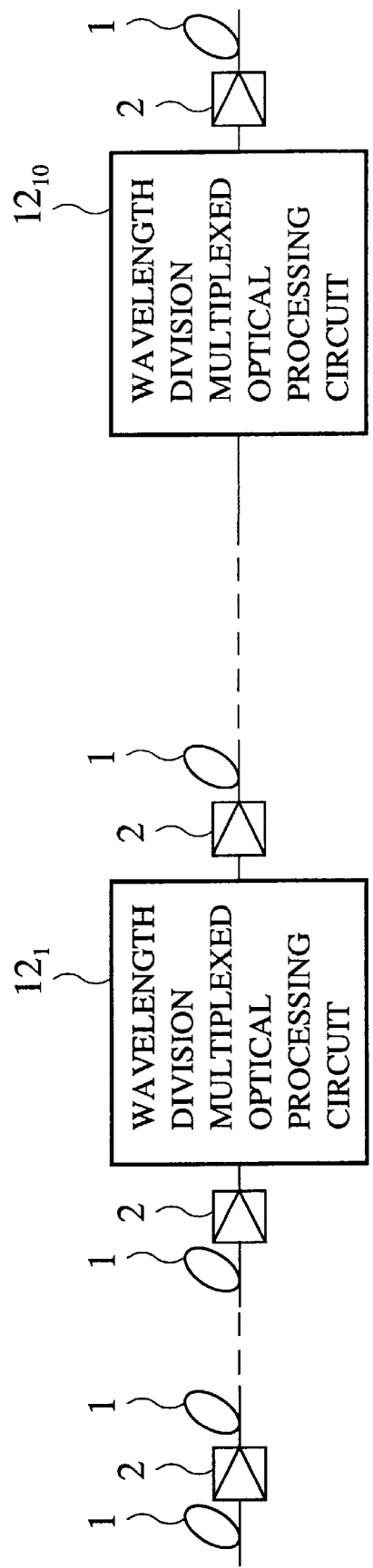
FIG. 11 is a block diagram of the third embodiment of an optical communication transmission path according to the resent invention.
Figure 12:
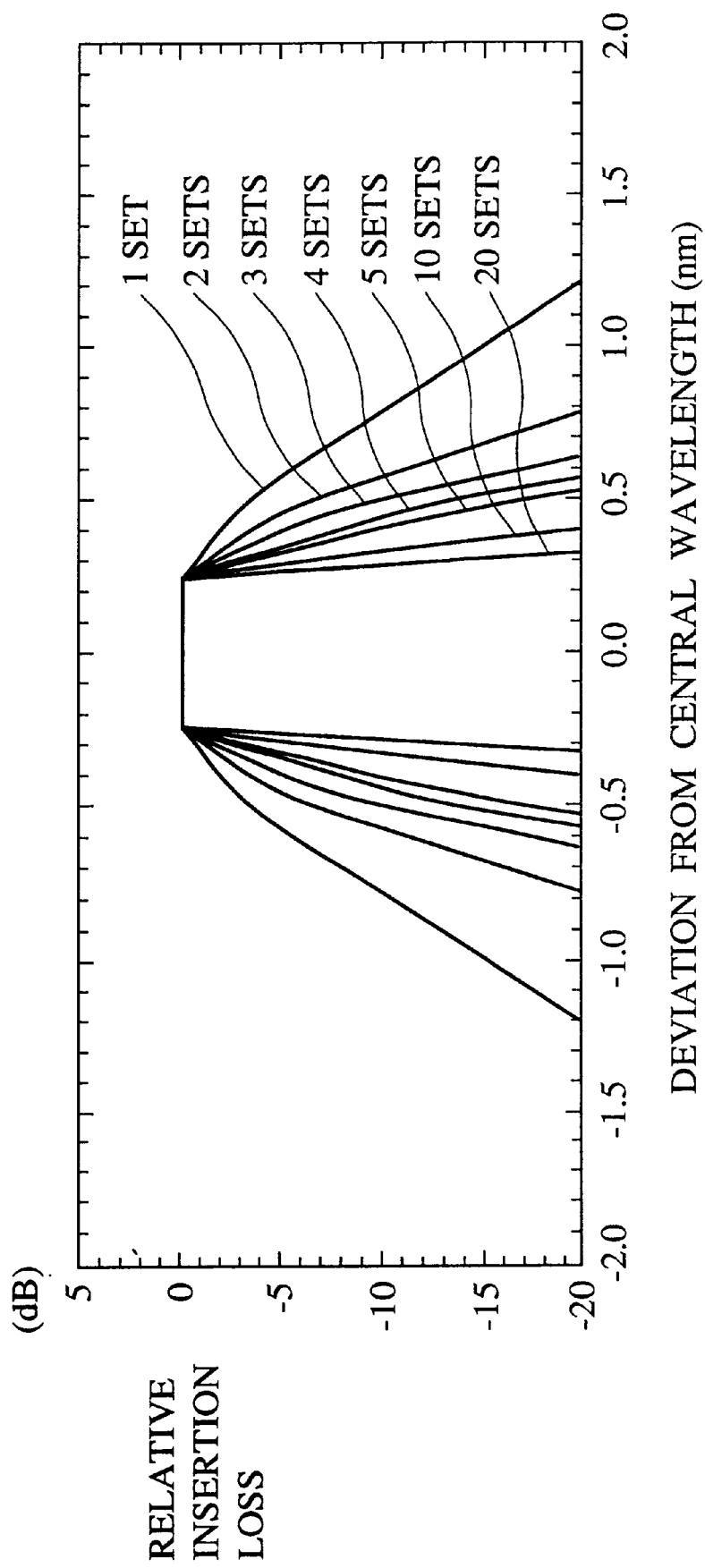
FIG. 12 is a graph showing a number of sets dependency f a transmission characteristic of a flat top type arrayed optical waveguides.
Figure 13:
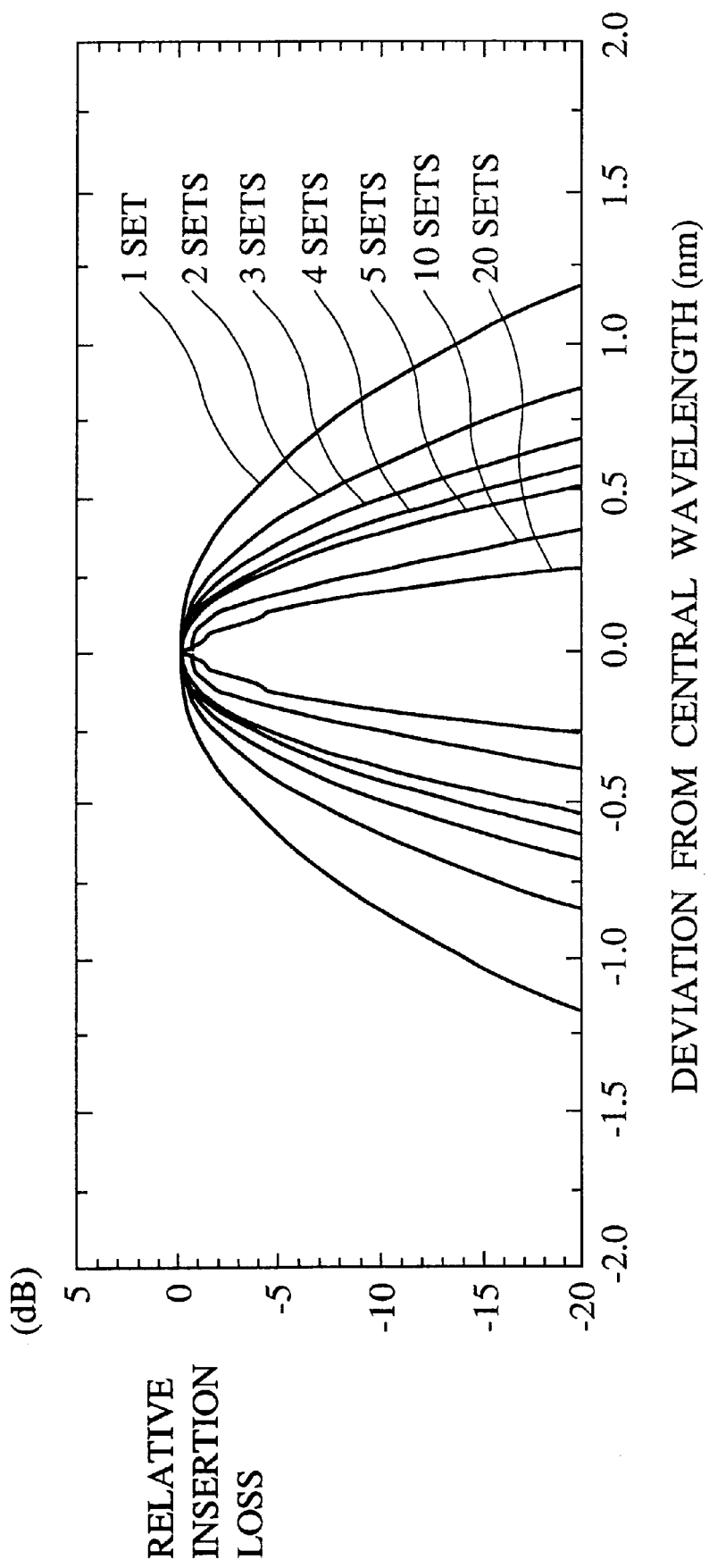
FIG. 13 is a graph showing a number of sets dependency of a transmission characteristic of a non-flat top type arrayed optical waveguides.

Referring now to FIG. 11 to FIG. 13, the third embodiment of an optical communication transmission path according to the present invention will be described in detail.

In this third embodiment, the optical communication transmission path has a configuration as shown in FIG. 11, where an optical amplifier 2 is provided at a prescribed shorter interval on an optical fiber 1 for transmitting wavelength division multiplexed optical signals, and a wavelength division multiplexed optical processing device 12 of the present invention is provided at a prescribed longer interval on the optical fiber 1. In FIG. 11, the suffix attached to the reference numeral 12 of the wavelength division multiplexed optical processing devices indicates an order of each wavelength division multiplexed optical processing device among all the wavelength division multiplexed optical processing devices 12 counted from the input side. Here, 3 dB bandwidth is 1.2 nm and 0.3 dB bandwidth is 0.4 nm.

Also, a flat top type arrayed optical waveguide is used in each wavelength division multiplexed optical processing device 12. In this embodiment, ten sets of the wavelength division multiplexed optical processing devices 12 are used in the optical communication transmission path so that the optical signals pass through the flat top type arrayed optical waveguides twenty times. FIG. 12 shows a number of sets dependency of the transmission characteristic of the flat top type arrayed optical waveguides. It can be seen from FIG. 12 that a sufficiently flat characteristic is maintained even after passing through twenty sets. In contrast, FIG. 13 shows a number of sets dependency of the transmission characteristic in a case of using non-flat top type arrayed optical waveguides. It can be seen from FIG. 13 that the characteristic becomes very peaky after passing as many as twenty sets. Such a peaky transmission characteristic as shown in FIG. 13 can degrade the optical signals, whereas the optical signal degradation can be avoided when the flat characteristic as shown in FIG. 12 is maintained.

Also, as the rejection characteristic of the arrayed optical waveguide is not ideal, the coherent cross-talk from the other channels can be caused, but it is known that a penalty can be confined within the tolerable range when the coherent cross-talk is made to be 30 dB or less. When plural sets of the arrayed optical waveguides are used as in FIG. 11, equivalently the cross-talk amount increases, but the cross-talk suffered by the entire optical communication transmission path can be limited to 30 dB or less when the rejection Rej satisfies the following condition (3), so that the characteristic degradation due to the coherent cross-talk can be prevented and therefore the transmission characteristic can be improved. Note that the following condition (3) is an expression for the rejection Rej which is a ratio of powers of the transmitted wavelength and the rejected wavelength in the arrayed optical waveguide wavelength demultiplexing circuit 3 and the arrayed optical waveguide wavelength multiplexing circuit 4.

$$\text{Rej} \geq (30 + 10 \log_{10}(n-1) + 10 \log_{10} m)/2 \text{ (dB)} \quad (3)$$

where Rej is the rejection, n is a number of wavelengths in the wavelength division multiplexed signals, m is a number of sets of the dispersion slope compensation circuits used in the optical communication transmission path.

It is also known that, in a case where an interference signal in the same wavelength as some signal wavelength is superposed onto a signal in that signal wavelength, the degradation due to the cross-talk is hardly caused when the interference signal power is smaller than the signal power by 30 dB or more. Namely, in the arrayed optical waveguide wavelength multiplexing circuit 4 at which the wavelength demultiplxed and processed signals are to be multiplexed, the signal wavelengths that have passed through routes different from a route through which the signal wavelength has passed are going to be superposed as interference signals. There are as many as [a total number of signal wavelengths) −1] of these interference signals, and the rejection is going to be increased as much (through a term related to n in the above condition (3)). Also, when there are plural sets of optical processing devices such as the dispersion slope compensation circuits in the optical communication transmission path, the interference signals are going to be accumulated as much and the rejection is going to be increased as much similarly (through a term related to m in the above condition (3)).

Figure 14:
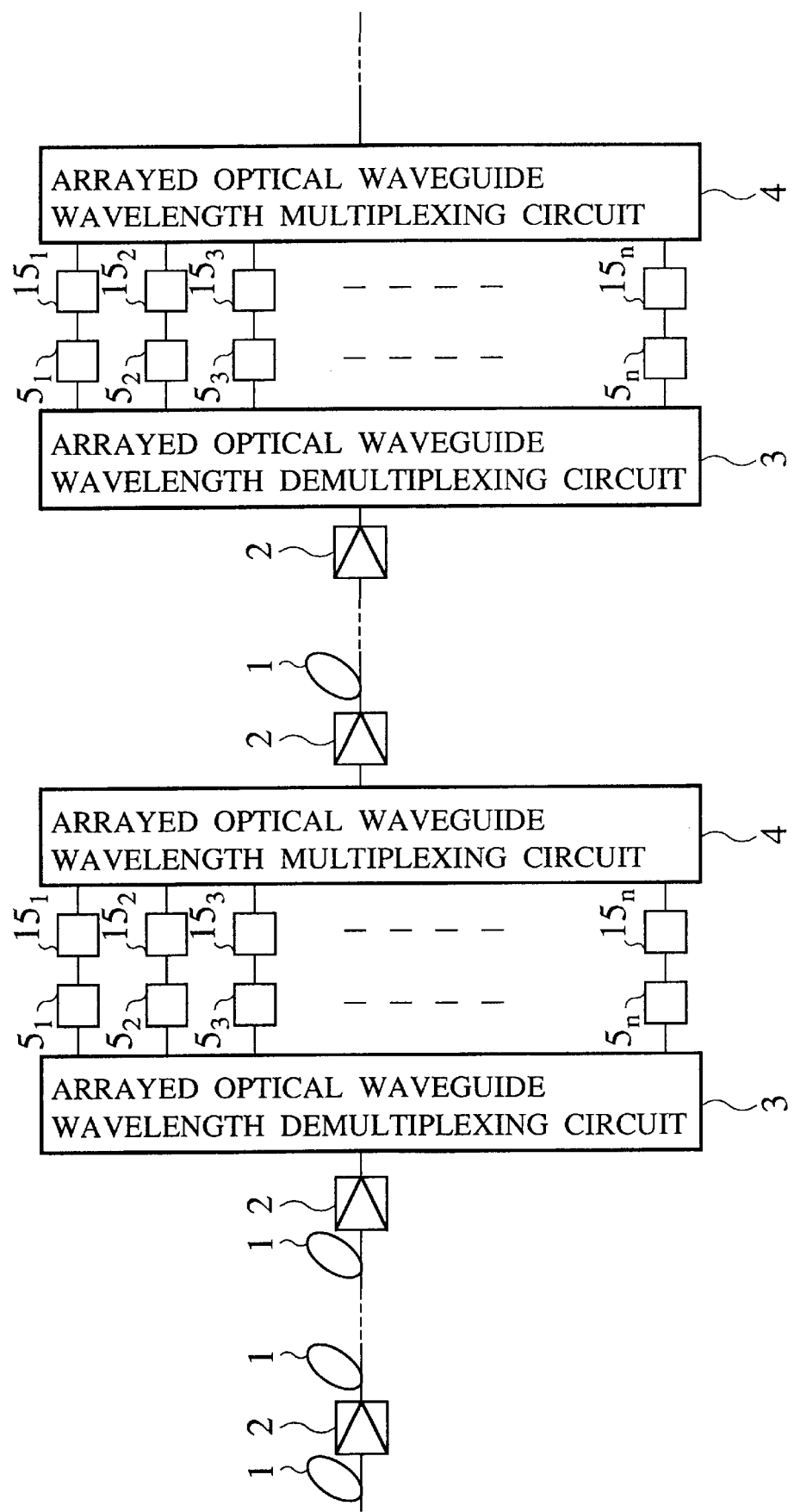
FIG. 14 is a block diagram of the third embodiment of an optical communication transmission path according to the present invention.

Referring now to FIG. 14, the fourth embodiment of an optical communication transmission path according to the present invention will be described in detail.

In this fourth embodiment, the optical communication transmission path has a configuration as shown in FIG. 14, where an optical amplifier 2 is provided at a prescribed shorter interval on an optical fiber 1 for transmitting wavelength division multiplexed optical signals, and a. wavelength division multiplexed optical processing device 12 of the present invention is provided at a prescribed longer interval on the optical fiber 1.

Here, the wavelength division multiplexed optical processing devices 12 are inserted at an interval equal to an interval of insertion of the optical amplifiers 2 or an integer multiple of an interval of insertion of the optical amplifiers 2. When this integer is one, it is a case in which the optical amplifier 2 and the wavelength division multiplexed optical processing device 12 are built-in inside each repeater. In a case of providing the minimum number of the wavelength division multiplexed optical processing device 12, there is only one wavelength division multiplexed optical processing device 12 provided over the entire optical communication transmission path.

More specifically, in a case of the optical communication transmission path of about 9000 km, the wavelength division multiplexed optical processing device 12 may be provided at every 1000 km, for example, and in a case of the optical communication transmission path of about 1000 km, the wavelength division multiplexed optical processing device 12 may be inserted at every repeater or just a single wavelength division multiplexed optical processing device 12 may be provided over the entire optical communication transmission path.

This wavelength division multiplexed optical processing device 12 comprises the arrayed optical waveguide wavelength demultiplexing circuit 3 for demultiplexing wavelength division multiplexed signals, the arrayed optical waveguide wavelength multiplexing circuit 4 for multiplexing wavelength division multiplexed signals, the dispersion equalizer elements 5, and optical amplifiers 15 having built-in automatic output control circuits. In FIG. 14, the suffix attached to the reference numerals 5 and 15 of the dispersion equalizer elements and the optical amplifiers indicates a channel number of the wavelength division multiplexed signals.

The wavelength dependency of the amplification characteristic of the optically amplifying transmission path formed by the optical fibers 1 and the optical amplifiers 2 varies according to secular changes of the optical fibers 1 and the optical amplifiers 2, so that the power of each wavelength division multiplexed optical signal is going to vary in time, and in the worst case, there can be a signal wavelength for which a satisfactory transmission cannot be realized. However, in this embodiment, the optical amplifiers 15 having built-in automatic output control circuit are used as the gain wavelength dependency compensation elements so that the power variation among the signal wavelengths is maintained constant by means of the optical amplifiers 15 and therefore it is possible to eliminate an influence due to secular changes and it becomes possible to construct an optical communication transmission path with a considerable endurance.

In addition, by inserting the dispersion equalizer elements 5 in a front stage of the optical amplifiers 15 having built-in automatic output control circuits, it is also possible to eliminate an influence due to secular changes of the dispersion equalizer elements 5.

As described, according to the present invention, the wavelength division multiplexed optical processing device is formed by: the first arrayed optical waveguide for demultiplexing optical signals entered from its light input terminal, and outputting them from its plural light output terminals; a plurality of correction units for correcting respective optical signals demultiplexed by the first arrayed optical waveguide; and the second arrayed optical waveguide for multiplexing optical signals outputted by the correction units and entered from its plural light input terminals, and outputting them from its light output terminal. In this configuration, the dispersion compensation and the gain compensation are carried out after the optical signals are demultiplexed wavelength by wavelength by the first arrayed optical waveguide, and then all the wavelengths are multiplexed again by the second arrayed optical waveguide. Here, the arrayed optical waveguide has the rejection of at least about 20 dB outside the transmission bandwidth so that the optical noise outside the transmission bandwidth can be suppressed and therefore the accumulated optical noise can be reduced.

Also, according to the present invention, the optical communication transmission path is formed by inserting the wavelength division multiplexed optical processing devices using arrayed optical waveguides with the flat top shaped transmission wavelength characteristic, at a prescribed interval on the optical communication transmission path, and the arrayed optical waveguide has the rejection of at least about 20 dB outside the transmission bandwidth, so that the optical noise outside the transmission bandwidth is suppressed and the accumulated optical noise is reduced. Moreover, by inserting a plurality of wavelength division multiplexed optical processing devices into the optical communication transmission path using optical amplifiers, the transmission characteristic of the wavelength division multiplexed optical signals can be improved considerably.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A wavelength division multiplexed optical processing device comprising:
    a first arrayed optical waveguide for demultiplexing entered wavelength division multiplexed optical signals, and outputting demultiplexed optical signals;
    a plurality of correction units for correcting respective optical signals demultiplexed by the first arrayed optical waveguide; and
    a second arrayed optical waveguide for multiplexing optical signals corrected by the correction unit, and outputting multiplexed optical signals;
    wherein each of the first arrayed optical waveguide and the second arrayed optical waveguide has a transmission wavelength characteristic with a flat top shape, and the flat top shape of the transmission wavelength characteristic has 0.3 dB bandwidth greater than or equal to $\frac{1}{3}$ of 3 dB bandwidth.

2. The device of claim 1, wherein each of the first arrayed optical waveguide and the second arrayed optical waveguide has a rejection defined as a ratio of powers of transmitted wavelengths and rejected wavelengths given by:

$$Rej \geq (30 + 10 \log_{10}(n-1) + 10 \log_{10} m)/2 \text{ (dB)}$$

where Rej is the rejection, n is a number of wavelengths in the wavelength division multiplexed optical signals, m is a number of sets of dispersion slope compensation circuits used in an optical communication transmission path on which the wavelength division multiplexed optical processing device is provided.

3. The device of claim 1, wherein the correction units carry out at least one of a dispersion slope compensation, a gain wavelength dependency compensation, and an accumulated optical noise reduction.

4. The device of claim 3, wherein the correction units carry out the dispersion slope compensation by using optical fiber gratings.

5. The device of claim 3, wherein the correction units carry out the dispersion slope compensation by using optical fibers having zero dispersion wavelength at 1.3 μm.

6. The device of claim 5, wherein the optical fibers having zero dispersion wavelength at 1.3 μm have dispersion amounts greater than those required for making dispersion of respective signal wavelengths exactly zero, and appropriate amount of abnormal dispersion for stabilizing optical pulses due to soliton effect.

7. The device of claim 3, wherein the correction units carry out the dispersion slope compensation by using dispersion compensation optical fibers having large normal dispersion at 1.55 μm.

8. The device of claim 7, wherein the dispersion compensation optical fibers have dispersion amounts less than those required for making dispersion of respective signal wavelengths exactly zero, and appropriate amount of abnormal dispersion for stabilizing optical pulses due to soliton effect.

9. The device of claim 3, wherein the correction units carry out the dispersion slope compensation by using optical fibers having zero dispersion wavelength at 1.3 μm, and dispersion compensation optical fibers having large normal dispersion at 1.55 μm.

10. The device of claim 9, wherein the optical fibers having zero dispersion wavelength at 1.3 μm and the dispersion compensation optical fibers have such dispersion amounts that dispersion of respective signal wavelengths cannot be made exactly zero and all the signal wavelengths are contained within abnormal dispersion region.

11. The device of claim 3, wherein the entered wavelength division multiplexed optical signals at the first arrayed optical waveguide has a waveform other than a non-return-to-zero waveform.

12. The device of claim 11, wherein the entered wavelength division multiplexed optical signals at the first arrayed optical waveguide has a return-to-zero waveform.

13. The device of claim 12, wherein the return-to-zero waveform has a duty ratio in a range of 10% to 80%.

14. The device of claim 12, wherein the return-to-zero waveform has an intensity ratio of 1.5 or more.

15. The device of claim 12, wherein the return-to-zero waveform has a position in time of a maximum light intensity not limited to a position in time corresponding to 50% of one bit time period.

16. The device of claim 12, wherein the return-to-zero waveform has at least two of properties that: (1) a duty ratio is In a range of 10% to 80%; (2) an intensity ratio is 1.5 or more; and (3) a position in time of a maximum light intensity is not limited to a position in time corresponding to 50% of one bit time period.

17. The device of claim 3, wherein the correction units carry out the dispersion slope compensation satisfying conditions that an accumulated abnormal dispersion amount for each signal wavelength satisfies the following equation (1) at each interval by which the dispersion slope compensation is carried out, and the following equation (2) after transmission over an entire optical communication transmission path on which the wavelength division multiplexed optical processing device is provided:

$$0 < d < 0.1 \times l \text{ (ps/nm)} \quad (1)$$

$$0 < D < 0.1 \times L \text{ (ps/nm)} \quad (2)$$

where d is a dispersion amount for an interval of insertion of dispersion slope compensation circuits in the optical communication transmission path, l is the interval of insertion of the dispersion slope compensation elements in km unit, D is a dispersion amount over the entire optical communication transmission path, and L is a total length of the optical communication transmission path in km unit.

18. The device of claim 3, wherein the correction units carry out the gain wavelength dependency compensation by using optical amplifiers with built-in automatic output control circuits and/or optical attenuators with built-in automatic output control circuits.

19. The device of claim 3, wherein the correction units carry out the dispersion slope compensation at a front stage of the gain wavelength dependency compensation.

20. The device of claim 1, wherein the entered wavelength division multiplexed optical signals at the first optical waveguide has an identical basic waveform for all signal wavelengths.

21. An optical communication transmission path for transmitting wavelength division multiplexed optical signals, comprising:

an optical transmission path; and at least one wavelength division multiplexed optical processing device using an arrayed optical waveguide having a transmission wavelength characteristic with a flat top shape, which is inserted into the optical transmission path at a prescribed interval, wherein the flat top shape of the transmission wavelength characteristic has 0.3 dB bandwidth greater than or equal to ⅓ of 3 dB bandwidth.

22. The optical communication transmission path of claim 21, further comprising optical amplifiers provided on the optical transmission path at a predetermined interval.

23. The optical communication transmission path of claim 22, wherein the prescribed interval for inserting the wavelength division multiplexed optical processing device is equal to or an integer multiple (or) of the predetermined interval for inserting the optical amplifiers.

24. The optical communication transmission path of claim 21, wherein the wavelength division multiplexed optical processing device includes:

a first arrayed optical waveguide for demultiplexing entered wavelength division multiplexed optical signals, and outputting demultiplexed optical signals;

a plurality of correction units for correcting respective optical signals demultiplexed by the first arrayed optical waveguide; and a second arrayed optical waveguide for multiplexing optical signals corrected by the correction unit, and outputting multiplexed optical signals.

25. The optical communication transmission path of claim 24, wherein the correction units carry out at least one of a dispersion slope compensation, a gain wavelength dependency compensation, and an accumulated optical noise reduction.

* * * * *

UNITED STATES PATENT AND TRADEMARK OFFICE
CERTIFICATE OF CORRECTION

PATENT NO.   : 6,181,449 B1
DATED        : January 30, 2001
INVENTOR(S)  : Hidenori Toga et al.

It is certified that error appears in the above-identified patent and that said Letters Patent is hereby corrected as shown below:

Column 7,
Line 54, insert "12." after -- device --.
Line 54, start a new paragraph beginning with -- From --.

Column 8,
Lines 14 and 16, delete the formula and insert
-- $0 < d < 0.1 \times \{ (ps/nm)$   (1)
   $0 < D < 0.1 \times L\ (ps/nm)$   (2) --.
Line 18, delete "1" and insert   -- $\{\bullet$ --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*